US007630571B2

(12) United States Patent
Cutler et al.

(10) Patent No.: US 7,630,571 B2
(45) Date of Patent: Dec. 8, 2009

(54) AUTOMATIC DETECTION OF PANORAMIC CAMERA POSITION AND ORIENTATION TABLE PARAMETERS

(75) Inventors: Ross G. Cutler, Redmond, WA (US); Ya Chang, Goleta, CA (US); Zicheng Liu, Bellevue, WA (US); Zhengyou Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 11/227,046

(22) Filed: Sep. 15, 2005

(65) Prior Publication Data

US 2007/0058879 A1 Mar. 15, 2007

(51) Int. Cl.
*G06K 9/40* (2006.01)
*G06K 9/48* (2006.01)

(52) U.S. Cl. .................................. 382/254; 382/199

(58) Field of Classification Search ................ 382/103, 382/151, 199, 209, 254, 260, 266; 348/169, 348/14.08, 187, E7.083; 370/260, 265–266, 370/269
See application file for complete search history.

(56) References Cited

U.S. PATENT DOCUMENTS

| | | | |
|---|---|---|---|
| 3,118,340 | A | 1/1964 | Iwerks |
| 5,539,483 | A | 7/1996 | Nalwa |
| 5,745,305 | A | 4/1998 | Nalwa |
| 5,793,527 | A | 8/1998 | Nalwa |
| 5,990,934 | A | 11/1999 | Nalwa |
| 6,111,702 | A | 8/2000 | Nalwa |
| 6,115,176 | A | 9/2000 | Nalwa |
| 6,128,143 | A | 10/2000 | Nalwa |
| 6,141,145 | A | 10/2000 | Nalwa |
| 6,144,501 | A | 11/2000 | Nalwa |
| 6,195,204 | B1 | 2/2001 | Nalwa |
| 6,219,090 | B1 | 4/2001 | Nalwa |
| 6,285,365 | B1 | 9/2001 | Nalwa |
| 6,356,397 | B1 | 3/2002 | Nalwa |
| 6,373,642 | B1 | 4/2002 | Wallerstein et al. |

(Continued)

FOREIGN PATENT DOCUMENTS

JP    1996125835 A    5/1996

(Continued)

OTHER PUBLICATIONS

Chang, et al (Automatic Head-Size Equalization in Panorama Images for Video Conferencing), pp. 1-42, Microsoft Research, May 2005.*

(Continued)

*Primary Examiner*—Daniel G Mariam

(57) ABSTRACT

A panoramic camera is configured to automatically determine parameters of a table upon which the camera is situated as well as positional information of the camera relative to the table. In an initialization stage, table edges are detected to create an edge map. A Hough transformation-like symmetry voting operation is performed to clean up the edge map and to determine camera offset, camera orientation and camera tilt. The table is then fit to a table model to determine table parameters. In an operational stage, table edges are detected to create an edge map and the table model is fit to the edge map. The output can then be used for further panoramic image processing such as head size normalization, zooming, compensation for camera movement, etc.

20 Claims, 12 Drawing Sheets

U.S. PATENT DOCUMENTS

| | | |
|---|---|---|
| 6,424,377 B1 | 7/2002 | Driscoll, Jr. et al. |
| 6,426,774 B1 | 7/2002 | Driscoll, Jr. et al. |
| 6,459,451 B2 | 10/2002 | Driscoll, Jr. et al. |
| 6,480,229 B1 | 11/2002 | Driscoll, Jr. et al. |
| 6,515,696 B1 | 2/2003 | Driscoll, Jr. et al. |
| 6,583,815 B1 | 6/2003 | Driscoll, Jr. et al. |
| 6,593,969 B1 | 7/2003 | Driscoll, Jr. et al. |
| 6,597,520 B2 | 7/2003 | Wallerstein et al. |
| 6,700,711 B2 | 3/2004 | Nalwa |
| 6,741,250 B1 | 5/2004 | Furlan et al. |
| 7,020,337 B2 | 3/2006 | Viola et al. |
| 7,031,499 B2 | 4/2006 | Viola et al. |
| 7,099,510 B2 | 8/2006 | Jones et al. |
| 7,119,829 B2 * | 10/2006 | Leonard et al. .......... 348/14.16 |
| 7,197,186 B2 | 3/2007 | Jones et al. |
| 7,212,651 B2 | 5/2007 | Viola et a |
| 7,277,118 B2 * | 10/2007 | Foote .......................... 348/36 |
| 2002/0034020 A1 | 3/2002 | Wallerstein et al. |
| 2002/0094132 A1 | 7/2002 | Hoffman et al. |
| 2002/0154417 A1 | 10/2002 | Wallerstein et al. |
| 2003/0193606 A1 | 10/2003 | Driscoll, Jr. et al. |
| 2003/0193607 A1 | 10/2003 | Driscoll, Jr. et al. |
| 2004/0021764 A1 | 2/2004 | Driscoll, Jr. et al. |

FOREIGN PATENT DOCUMENTS

| | | |
|---|---|---|
| WO | WO 2004/112290 | 12/2004 |
| WO | WO 2005/002201 | 1/2005 |

OTHER PUBLICATIONS

Chang, et al; Automatic Head-Size Equalization in Panorama Images for Video Conferencing; MSRT-TR-2005-48; May 2005.

* cited by examiner

FIG. 1A
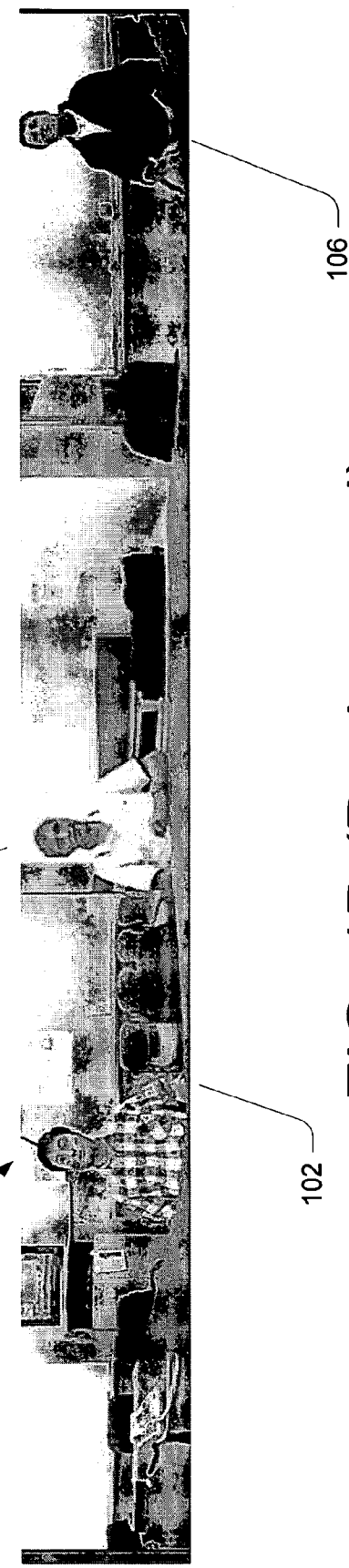
FIG. 1B (Background)

AUTOMATIC DETECTION OF PANORAMIC CAMERA POSITION AND ORIENTATION TABLE PARAMETERS

BACKGROUND

Panoramic images can either be cylindrical or non-cylindrical. A cylindrical panoramic image has uniform resolution across a span of the panorama while a non-cylindrical panoramic image has varying degrees of resolution across the span of a panorama. Cylindrical panoramas are ideal in conference room situations where parties are seated around a round conference table. Since the parties are equidistant from the panoramic camera, it is suitable that resolution for each camera comprising the panoramic camera be the same.

However, in a situation wherein a conference table is not round (e.g. rectangular), parties are seated at various distances from the panoramic camera. As a result, parties seated farther away from the panoramic camera will appear impractically small in resulting panoramic images unless they are imaged at a higher resolution than parties seated closer to the panoramic camera.

FIG. 1A shows a 360 degree panoramic image 100 of a meeting room. Meeting participants (102, 104, 106) are shown seated around a 10'×5' conference table 108. The meeting participant 104 seated in between the other meeting participants (102, 106) appears very small compared to the other meeting participants (102, 106) because he is seated farther away from a camera producing the panoramic image 100.

This has at least two negative consequences. First, it is difficult for remote meeting participants (not shown) to see some faces, thus negatively affecting the video conferencing experience. Second, there is a waste of screen space and network bandwidth because a significant number of image pixels are used on the background instead of on the meeting participants.

As technology advances, inexpensive high-resolution panoramic video cameras are becoming more readily available. But due to network bandwidth and user's screen space, only a smaller-sized image can be sent to remote clients. Therefore, how to effectively use the pixels is a critical problem in improving video conferencing experiences.

Techniques—such as non-cylindrical cameras and spatially-varying-uniform (SVU) scaling functions—can be used to solve this problem. FIG. 1B shows a panoramic image 120 similar to the panoramic image 100 shown in FIG. 1A but after head-size normalization. To perform head-size normalization, a camera's position relative to a table on which it rests, an orientation of the camera, and the table size and shape must be known. Current technology requires this information to be entered manually.

SUMMARY

The present disclosure describes ways in which a position on a table, an orientation and a tilt of a panoramic (i.e. omnidirectional) camera, as well as a size and shape of the table, can be automatically derived using a symmetrical property of the table and known characteristics of the camera (e.g., camera height and field of view). As a result, it is easier for a user to set up and use the camera. Additionally, the panoramic camera is more robust to camera movements during operation.

BRIEF DESCRIPTION OF THE DRAWINGS

The foregoing and other aspects of the subject matter disclosed herein will become more readily appreciated and will become better understood by reference to the following detailed description, when taken in conjunction with the accompanying drawings, wherein:

FIG. 1A shows a prior art panoramic image before head-size equalization.

FIG. 1B shows a prior art panoramic image after head-size equalization.

DETAILED DESCRIPTION

Overview

Figure 2:
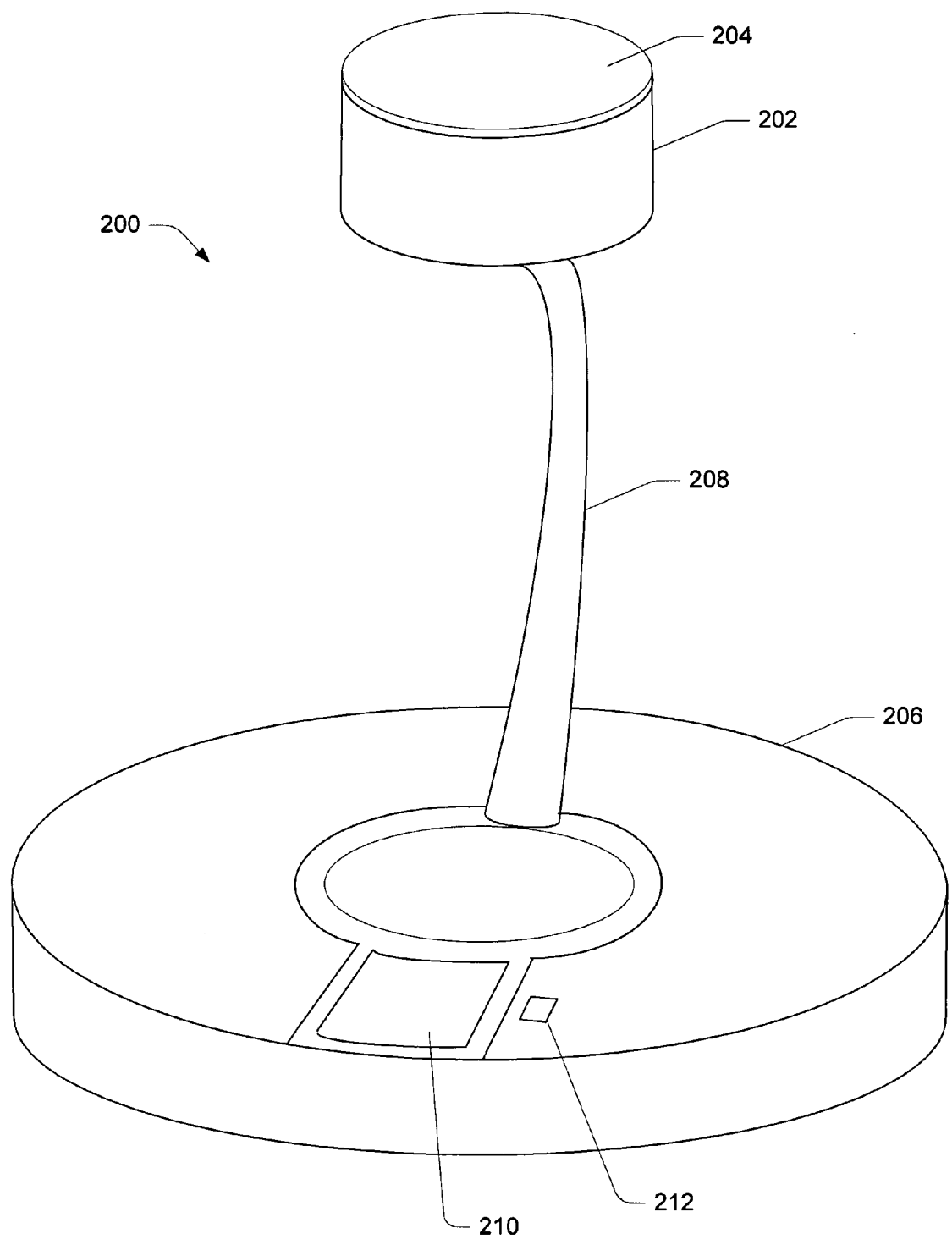
FIG. 2 is an illustration of an exemplary panoramic camera in accordance with the present description.

Recent technological advances have increased the popularity of video teleconferences wherein a panoramic camera situated on a conference room table is used to image meeting participants seated at all positions around the conference room table. While a panoramic camera is capable of capturing each participant's face, one negative aspect is that the image sizes of the meeting participants are not uniform in size due to the varying distances at which they are located from the camera.

As a result, it is difficult to discern an identity of one or more meeting participants that are seated at a significant distance from the camera. Furthermore, when a meeting participant's image is small, there is more background in the image. Thus, screen space and network bandwidth are not utilized efficiently because a significant amount of image space is taken up by insignificant objects.

The problem of varying head sizes can be solved in various ways. Spatially-varying-uniform (SVU) scaling functions address this problem by warping a panoramic image to normalize participants' head sizes without creating discontinuities in the image. Another way to address this problem is to implement a non-cylindrical panoramic camera that provides a higher resolution toward table locations that are situated a significant distance away from a camera location.

To implement a resolution to the head size problem described above, table parameters and a location and orientation of a camera with respect to the table must be known and entered manually. Still, there is a problem if the camera is moved during operation. Whenever this happens, a user has to manually mark an image. Such manual operations are tedious and time consuming.

In the following discussion, ways to automatically determine table parameters, camera location and camera orientation are described with respect to methods and products. The automatic determination of these parameters makes it easier to use a panoramic camera and provides a more aesthetically pleasing result.

Most conference room tables are rectangular or rectangular-like in shape. Such tables exhibit a bilateral symmetry property. Rectangular-like means that while the table shape is generally recognizable as a rectangle, there are some features that make it different from a true rectangle. For example, some conference room tables have rounded corners. Others have lengthwise edges that are bowed out so that a width across the center of the table is longer than a width at either end of the table.

The techniques described herein exploit the bilateral symmetry of these types of tables to detect table edges from an edge map. Once the table edges are known, the table edges can be fit to a table model. The table model can then be fit to an edge map of the table when in use.

Generally, a user trains a panoramic camera with respect to a conference table by placing the camera on the table and pressing a training initiation button. This causes an edge detector to create an edge map for the objects imaged by the camera. A symmetry voting variation of a Hough transform is applied to clean up the edge map (i.e. filter out non-table edges) and to determine a camera location (i.e. an offset from the center of the table), camera orientation and camera tilt (direction and magnitude).

The cleaned-up edge map is fit to a table model to determine dimensions (i.e. length and width) of the table. The camera then has the information it needs to perform various other functions, such as head size normalization, zooming, camera movement correction, etc.

Once a camera is trained to a particular table, the camera may be used in a conference situation. When the camera images a conference table that is in use (i.e. a cluttered table), it creates an edge map. Since the table model is already known, the edge map is then fit to the table model. A subsequent operation such as head size normalization can then be performed. Other operations that require table parameters and/or camera position parameters can also use the derived information. These operations include, but are not limited to, zooming and compensation for camera movement.

Exemplary Panoramic Image with Meeting Participants

FIG. 1A is an exemplary panoramic image 100 (prior art) that shows three meeting participants (102, 104, 106) seated around a conference room table 108. The conference room table 108 is ten (10) feet long and five (5) feet wide. The image of the meeting participant 104 seated farthest away from the camera is much smaller than the image of the other meeting participants 102, 106.

FIG. 1B is an exemplary panoramic image 120 of the same meeting participants (102, 104, 106) seated around the conference room table 108. The panoramic image 120 has been adjusted to normalize the head sizes of the meeting participants. As a result, the head size of the meeting participant 104 seated farthest away from the camera appears approximately the same size as the head sizes of the meeting participants 102, 106 seated closer to the camera.

Exemplary Panoramic Camera

The exemplary panoramic camera 200 includes a shutter housing 202 and a shutter housing cover 204. The shutter housing 202 is connected to a camera base 206 by a support column 208. Although not shown, when in operation, a camera lens assembly extends from within the shutter housing 202 to image the surrounding area.

A user interface unit 210 is included in the exemplary panoramic camera 200 and provides input from a user and/or output to a user in the form of buttons, sliders, displays, keys, pads, and the like. The camera base 206 houses hardware and software components (not shown) that provide functionality to the exemplary camera 200. An electronic connection (not shown) is provided via the support column 208 to one or more electronic components (not shown) located within the shutter housing 202 of the exemplary camera 200.

An actuatable training initiation button 212 is located on the camera base 206. As will be described in greater detail below, when actuated, the training initiation button 212 initiates a training procedure wherein the camera is trained to create a model for a table on which the camera is situated. During the training procedure, the panoramic camera 200 determines a position of the panoramic camera 200 on the table and an orientation and tilt of the panoramic camera 200. Training can also be initiated via the PC connected to the camera base via a USB cable.

Exemplary Cylindrical Projection Model

Figure 3:
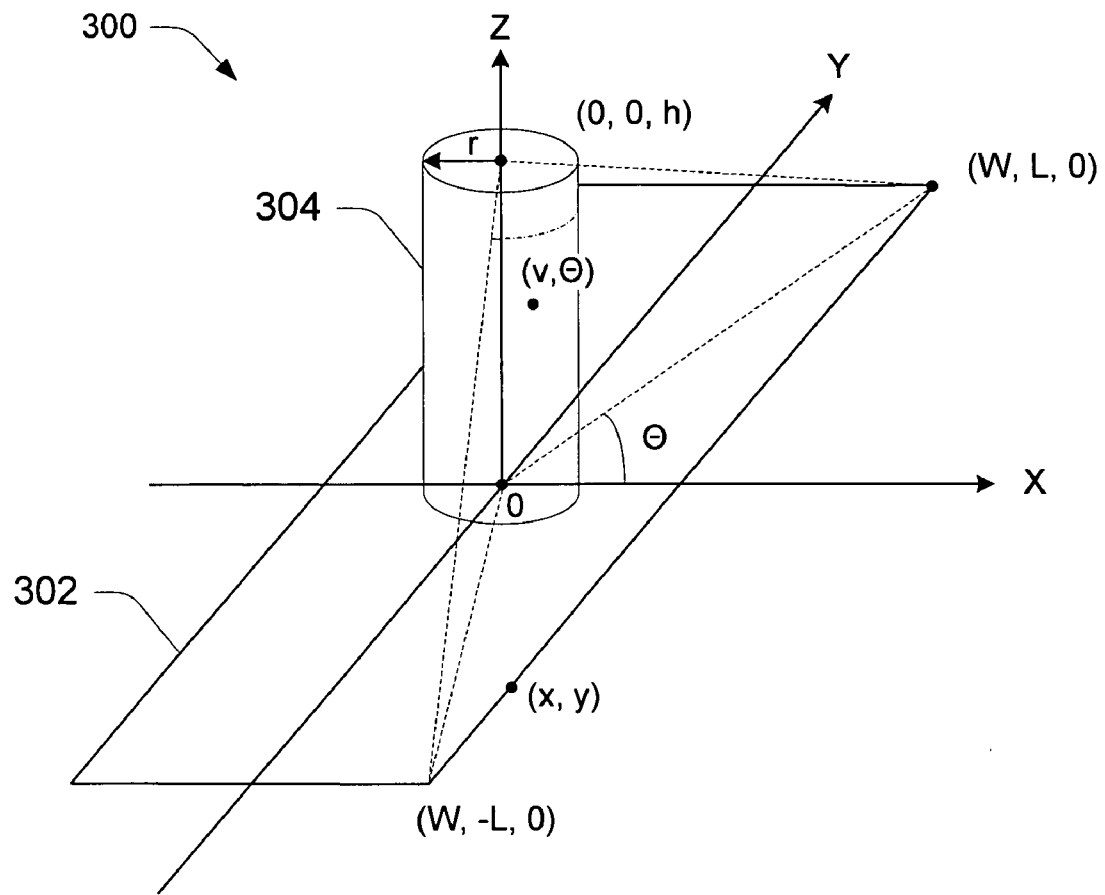
FIG. 3 is a depiction of an exemplary cylindrical projection model
Figure 3:
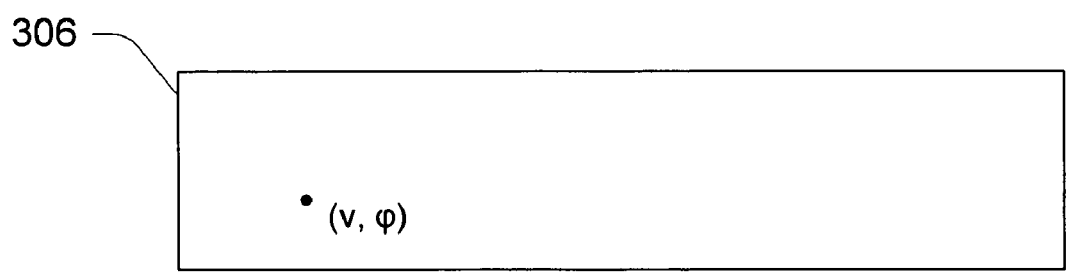

FIG. 3 depicts an exemplary cylindrical projection model 300 that identifies terms that are used in the following discussion. The model 300 depicts a camera (not shown) situated at a center (0) of a rectangular table 302 having a table size of 2W*2L. An X axis divides a length of the table 302 and a Y axis divides a width of the table 302. A Z axis extends from the table center (0) in a direction virtually normal to a plane of the table 302 (i.e. in practice, the camera may tilt slightly from normal).

A projection center (0, 0, h) is located at the center of a cylindrical film 304 model that has radius, r. The camera is oriented at angle θ. A table edge from (W, L, 0) to (W,−L, 0) is projected on the cylinder filmed as indicated by dashed line 306.

The projection of the table edge from (W, L, 0) to (W, −L, 0) is:

$v = h(1 - r \cos \theta / W)$ where $\theta \in [-\arctan(L/W), \arctan(L/W)]$.

Other table edges are projected similarly.

In practice, a camera may be tilted due to one or more factors such as a mechanical alignment problem or an uneven table surface. Also, a camera will not typically be at the exact center of a table but will be offset some distance from the table center.

For purposes of the present discussion, $O_x$ denotes a camera offset from the table center (0) in a direction of the X axis and $O_y$ denotes a camera offset from the table center (0) in a direction of the Y axis. Also, ω denotes a direction of a camera tilt (see FIG. 4) and α denotes a magnitude (or angle) of the tilt.

The projected table curve for a rectangular table is $v = h(1 - \cos \theta / (W + O_x)) + r \cos(\theta - \omega) \sin \alpha$      [Equations 1 -1]

$\theta \in [\arctan((L-O_y)/(W-O_x)), \arctan((L-O_y)/(W-O_x))]$

For each point (x, y) on a table edge, a corresponding point (v, θ) is projected on the cylindrical film. For discussion purposes, assume that the cylindrical film is cut at θ=hs. When the cylindrical film is flattened to a planar image space 308, point (v, θ) of the cylindrical film maps to point (v, φ) of the planar image space 308 and θ=φ+hs. Substituting these values in the equations listed above will obtain the equations of the projected curves in the planar image space 308.

Generally, there is a one-to-one mapping from points on the cylindrical film to points on the table through the projection center (0, 0, h). $F_1$ and $F_2$, below, denote the mapping from the table 302 to the cylindrical film 304, and $F_1^{-1}$ and $F_2^{-1}$ denote the mapping from the cylindrical film 304 to the table 302.

$$v = F1(x, y, z, h, r, \omega, \alpha, O_X, O_Y, hs);$$

$$\phi = F2(x, y, z, h, r, \omega, \alpha, O_X, O_Y, hs);$$

$$x = F1^{-1}(v, \phi, h, r, \omega, \alpha, O_X, O_Y, hs);$$

$$y = F2^{-1}(v, \phi, h, r, \omega, \alpha, O_X, O_Y, hs). \qquad \text{Equations [1-2]}$$

Camera Tilt

Figure 4:
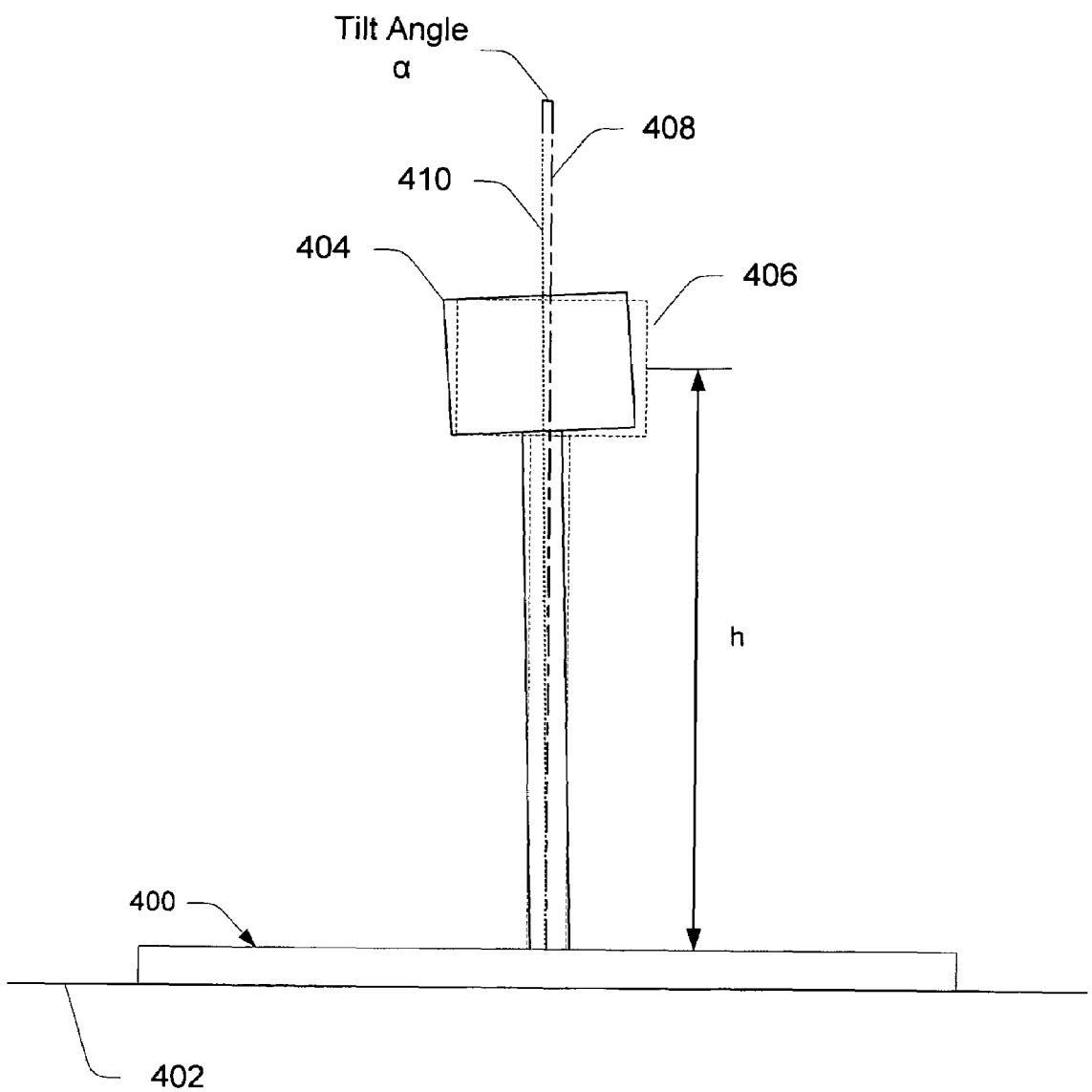
FIG. 4 is an illustration depicting camera tilt.

FIG. 4 is an illustration depicting an exemplary panoramic camera 400 that tilts from a vertical axis. The exemplary panoramic camera 400 is shown resting atop a table 402. An actual position 404 of the exemplary panoramic camera 400 is shown with reference to a nominal position 406 (or original position) of the exemplary panoramic camera 400.

A tilt angle $\alpha$ is a difference between a vertical axis 408 of the camera 400 in the nominal position 406 and a vertical axis 410 of the camera 400 in the actual position 404. In the present discussion, the tilt angle $\alpha$ is measured in radians.

Exemplary Conference Table/Camera Model

Figure 5:
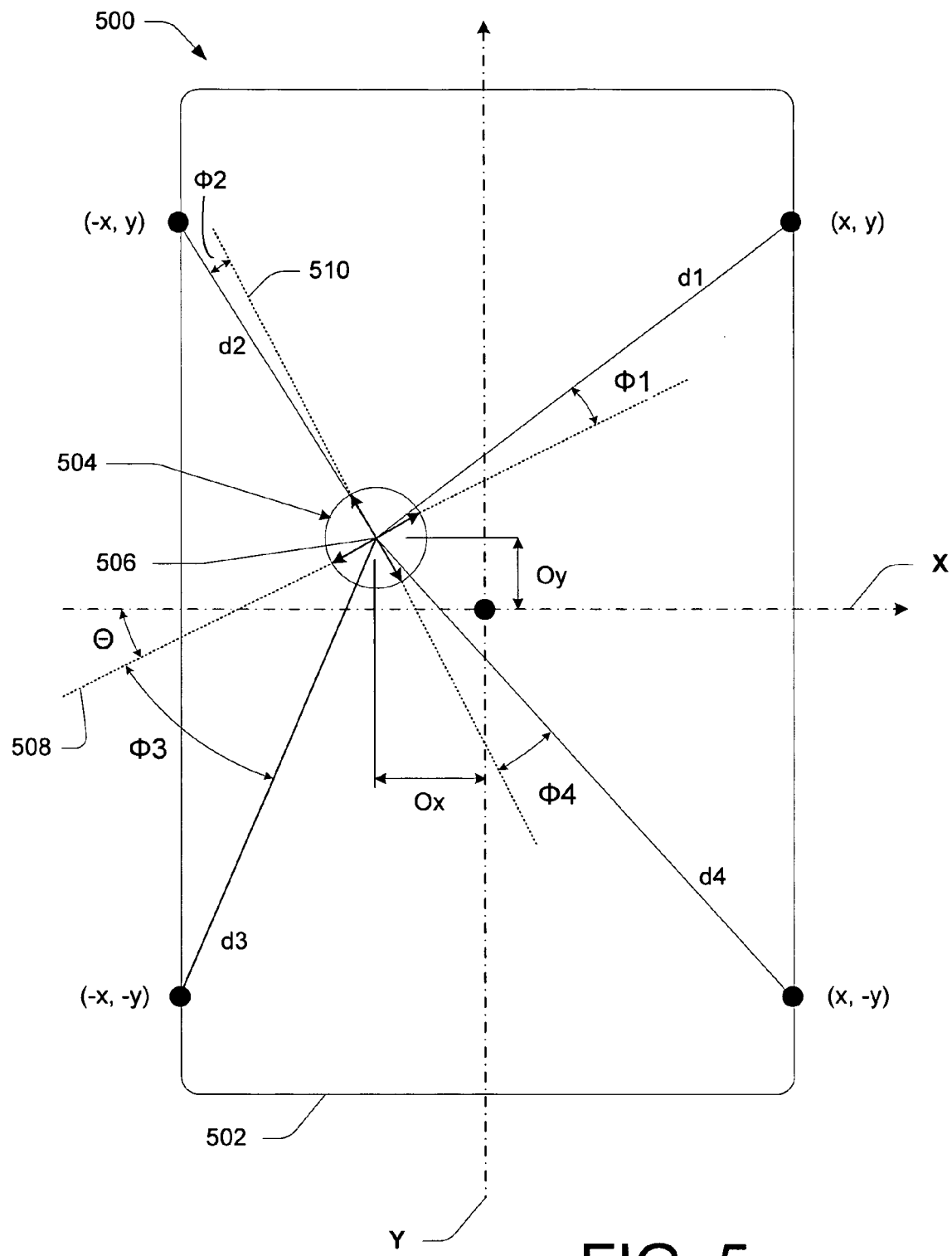
FIG. 5 is a diagram showing a relationship between a conference table and a panoramic camera.

FIG. 5 is a diagram of a relationship between a conference table 502 and a panoramic camera 504 that shows characteristics and labels that are used in the following discussion. The conference table 502 has bilateral symmetry about an X axis and a Y axis. A point (x, y) on a table edge corresponds to three other points based on this bilateral symmetry: (-x, y); (-x, -y); and (x, -y).

The diagram 500 shows the panoramic camera 504 having a center 506. A Z axis (not shown) extends in a perpendicular fashion from the center 506 of the panoramic camera 504. A line, d1, extends from the center 506 of the panoramic camera 504 to point (x, y). Similarly, lines d2, d3 and d4 extend from the center 506 to points (-x, y), (-x -y) and (x, -y), respectively.

A camera orientation is indicated by $\alpha$ and camera axes 508, 510 corresponding to the camera orientation relate to d1, d2, d3 and d4 by angles $\phi 1$, $\phi 2$, $\phi 3$ and $\phi 4$, respectively. As previously noted, $O_x$ denotes a camera offset from the table center (0) in a direction of the X axis and $O_y$ denotes a camera offset from the table center (0) in a direction of the Y axis.

Exemplary Panoramic Camera System

Figure 6:
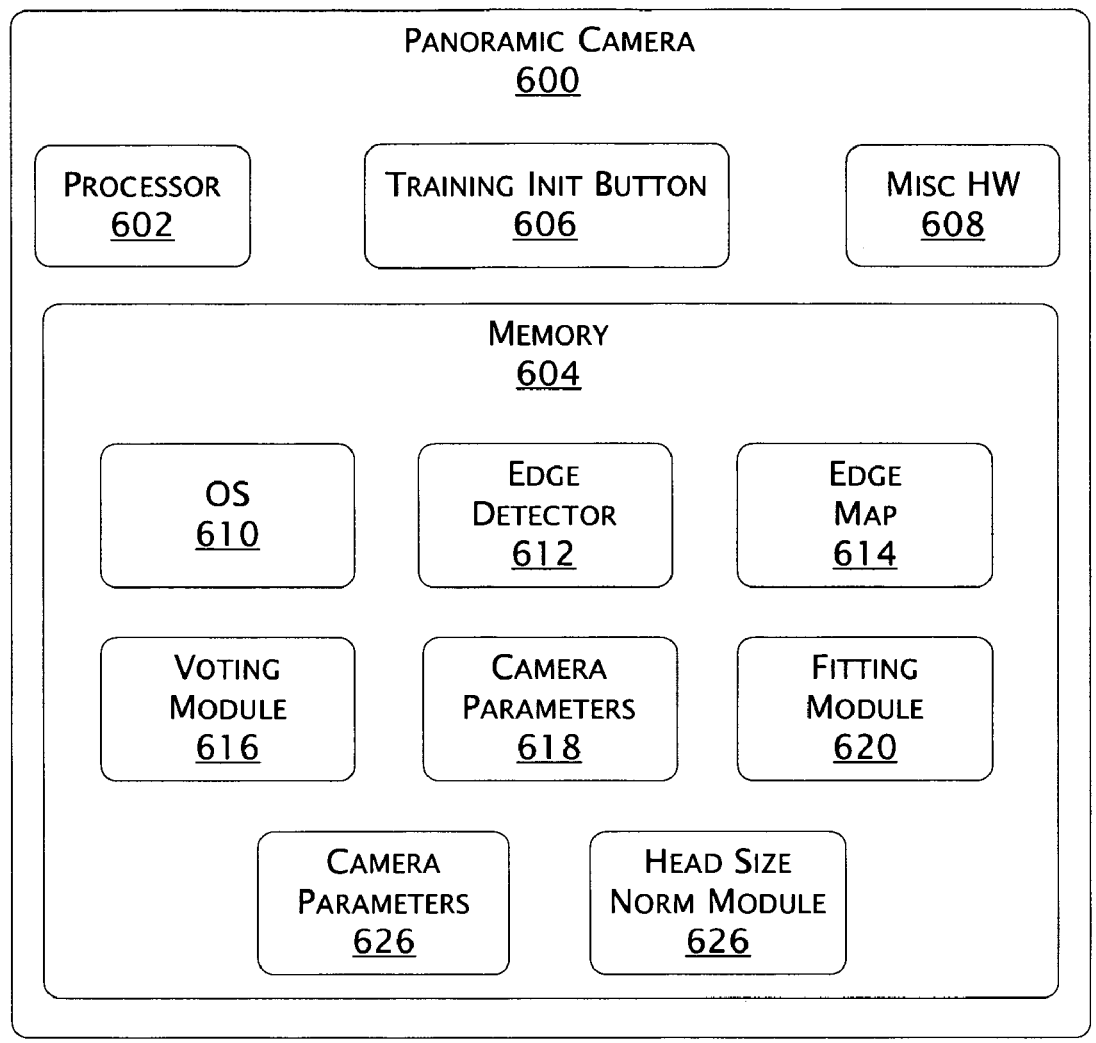
FIG. 6 is a block diagram of an exemplary panoramic camera configured to automatically detect table edges, camera position parameters and table parameters

FIG. 6 is a block diagram of an exemplary panoramic camera 600 configured to automatically detect table edges, camera position parameters and table parameters. It is noted that the exemplary panoramic camera 600 is a simplified diagram designed to exhibit elements pertinent to the present description. In practice, the panoramic camera includes elements necessary to operation of the camera for functions outside the scope of the present discussion.

The exemplary panoramic camera 600 includes a processor 602 and computer-readable memory 604. The processor 602 is configured to execute instructions stored in the memory 604. The camera 600 also includes a training initiation button 606 (as shown in FIG. 2) and miscellaneous hardware elements necessary to support operational functionality of the exemplary panoramic camera 600.

An operation system 610 is stored in the memory 604 and includes instructions that are executable on the processor 602 to carry out normal operational functionality of the exemplary panoramic camera 600. The memory 604 also includes an edge detector 612 which is configured to create an edge map 614. The edge detector 612 can implement any edge detection technique known in the art that is configured to detect edges in a camera image, such as the edge detection technique described in "Edge Detection With Embedded Confidence" by P. Meer and B Georgescu, IEEE Trans. Pattern Anal. Machine Intell., 23, 1351-1365, December 2001.

The memory 604 also stores a voting module 616 that is configured to perform a modified Hough transform that cycles through probable camera positions and determines that the probable camera position that most satisfies the symmetrical aspect of the table. By identifying points on an edge that have corresponding points of symmetry as being points on a table edge, the voting module 616 can eliminate most edges that appear in the edge map 614 that are not table edges.

The voting module 616 determines certain camera parameters 618, such as a camera offset from a center of the table ($O_X$ and $O_Y$), direction of camera tilt ($\omega$) and magnitude of camera tilt ($\alpha$). The voting module 616 and its operations are discussed in greater detail below, with respect to FIG. 8.

A fitting module 620 is also stored in the memory 604 of the exemplary panoramic camera 600. When the camera is in training mode, the fitting module 620 is configured to fit the edge map 614 (after being filtered by the voting module 616) to a table model 622 to identify table parameters 624. In training mode, the table (ideally) is uncluttered and thus results in a more accurate table model.

Figure 7:
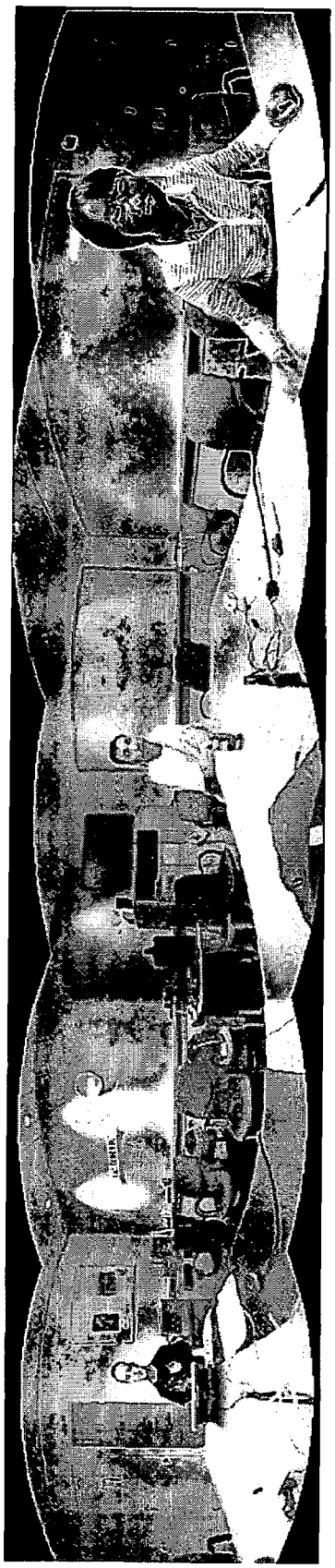
FIG. 7 is an exemplary image of a cluttered table captured by a panoramic camera.

In operational (i.e. non-training) mode, the fitting module 620 is configured to fit the table model 622 previously identified to the edge map 614. In operational mode, the table is cluttered in that it is partially covered by people sitting at the table and by items (notebooks, computers, pens, etc.) that the people have place on the table. FIG. 7 is an exemplary image captured by a panoramic camera where the table on which the camera is situated is cluttered. But since the table model 622 is already known during the operational mode, the fitting module 620 can more easily identify table edges even when the table is cluttered.

The memory 604 also stores a head size normalization module 626 that is configured to utilize the camera parameters 618 and the table parameters 624 to normalize the images of heads of people seated around the table. As has been noted, the camera parameters 618 and the table parameters 624 may be used in other camera procedures such as zooming and camera movement correction. In this regard, the head size normalization module 626 is shown for example purposes only.

The elements shown in FIG. 6 and the functionality thereof are discussed in greater detail below, with respect to subsequent figures.

Exemplary Methodological Implementation: Camera Training

Figure 8:
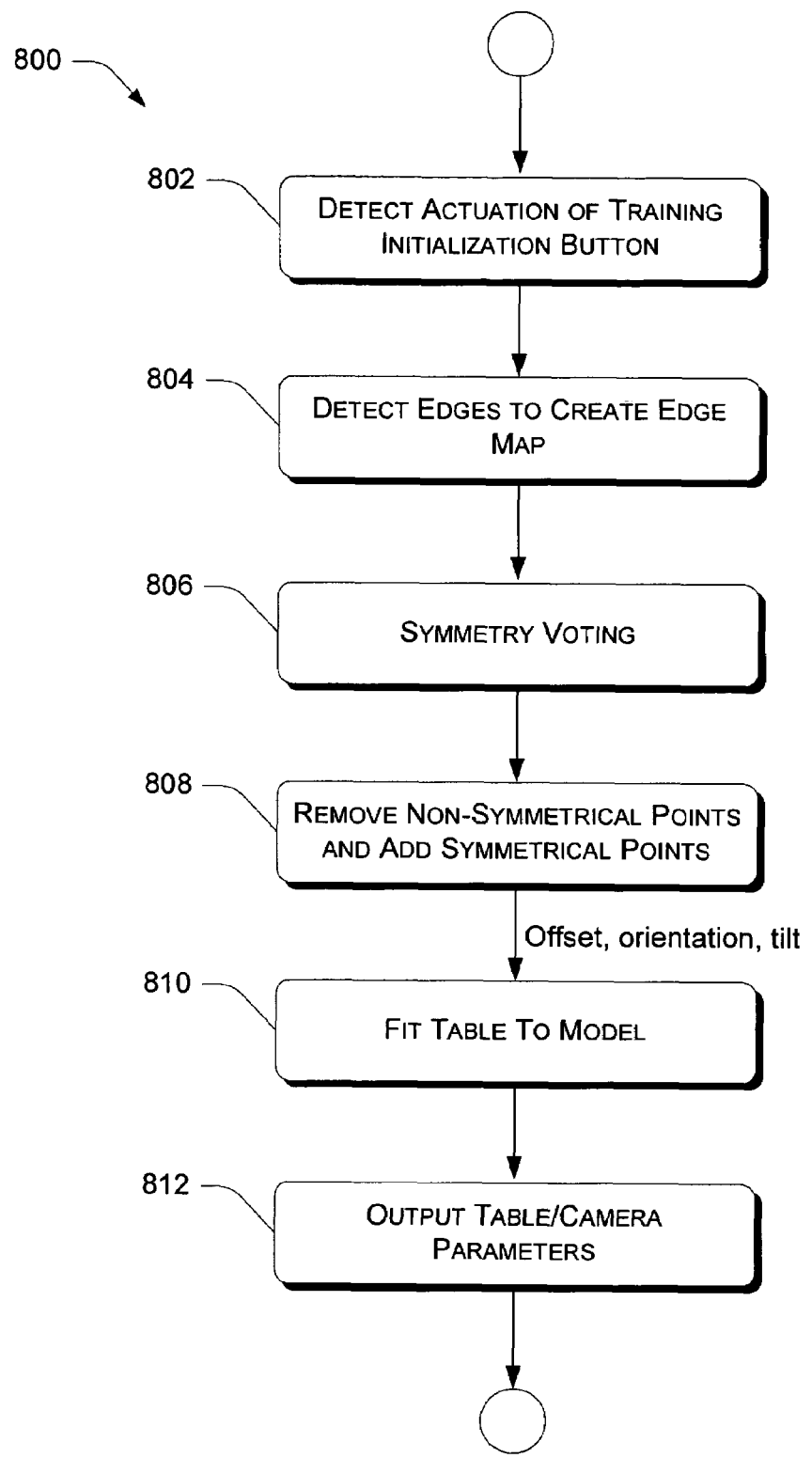
FIG. 8 is a flow diagram that depicts an exemplary methodological implementation for training a panoramic camera to automatically detect table edges and camera positional parameters and orientation while the camera is in training mode

FIG. 8 is a flow diagram 800 that depicts a methodological implementation for training a panoramic camera to automatically detect table edges and camera positional parameters and orientation while the camera is in training mode. In the following discussion of FIG. 8, continuing reference will be made to elements and reference numerals contained in other figures, FIG. 6 in particular. In addition, subsequent figures are referenced to in the following discussion.

It is noted that the particular steps of the flow diagram 800 may be implemented in more, fewer and/or other steps without departing from the methodological implementation described therein. Furthermore, one or more of the steps shown in the flow diagram 800 may be performed in a sequence other than that shown in FIG. 8 without departing from the nature of the methodological implementation described therein.

At block 802, the operating system 610 detects an actuation of the training initialization button 606. This indicates that a user has initiated the process of having the camera detect the table to derive camera and table parameters. This is done when the camera 600 needs to be oriented, such as when the camera 600 is first placed on the table.

Figure 9:
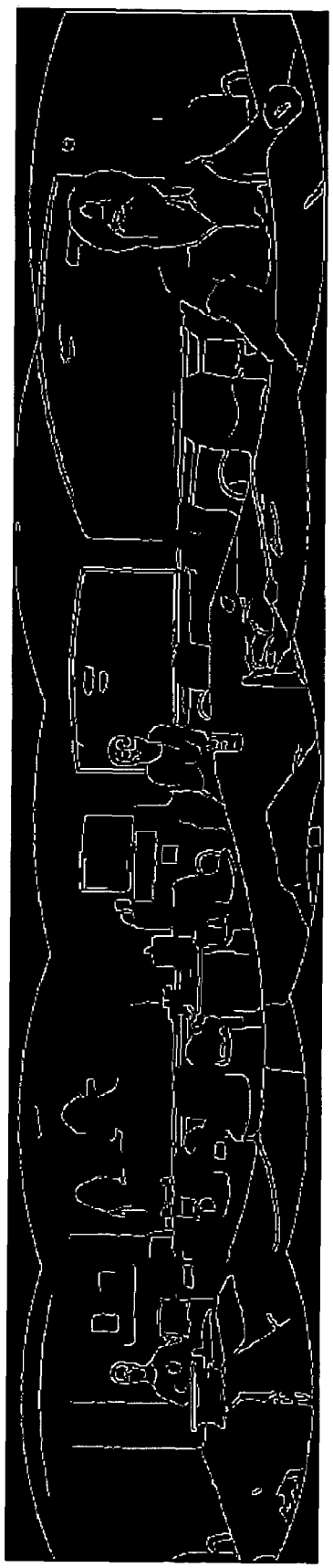
FIG. 9 depicts an exemplary edge map derived from an image taken by a panoramic camera.

At block 804, the edge detector 612 (FIG. 6) of the exemplary panoramic camera 600 applies a general image segmentation algorithm to detect edges in an image and creates the edge map 614. The edge detector 612 may be any edge detector known in the art that is configured to detect sudden changes in imaged objects to determine edges in the object. The detected edges include the table edges, but also include other edges, such as outlines of meeting participants, background object edges, etc. FIG. 9 depicts an exemplary edge map derived from an image taken by a panoramic camera.

To clean up the edge map 614 so that most non-table edges are filtered out, the voting module 616 applies symmetry voting at block 806. The symmetry voting takes advantage of the bilateral symmetry of the table. By comparing points on edges to symmetrically corresponding points in the image, the voting procedure can estimate which edge points are likely to be points on a table edge.

For example, the point (x, y) in FIG. 5 has symmetrically corresponding points at (−x, y), (−x, −y) and (x, −y). While it is possible that a non-table edge point may have symmetrically corresponding edge points, it is unlikely that an edge point will have three edge points that correspond symmetrically.

The symmetry voting works by enumerating multiple possible values for $O_X$ (X offset), $O_Y$ (Y offset), $\theta$ (camera orientation), $\omega$ (tilt direction) and $\alpha$ (tilt magnitude) within a specified range of values. For each possible value, the voting module 616 checks each point on the edge map 614 to see how many of its symmetric projections are also on the edge map. When a symmetrically corresponding point is detected, a weight corresponding to the possible value is incremented. After all possible values within the specified range have been evaluated, the largest accumulated weight is selected as the solution.

In one implementation, all the values listed above are evaluated in the same symmetry voting process. In at least one other implementation, however, it is more efficient to perform a first symmetry voting for $O_X$, $O_Y$ and $\theta$, and then to perform a second symmetry voting for $\omega$ and $\alpha$.

Pseudo-code outlining the algorithm for said first symmetry voting is:

```
[1]   Clear global h[ ][ ][ ]
[2]   For O_X = O_X min; O_X <= O_X max; O_X++
[3]     For O_Y = O_Y min; O_Y <= O_Y max; O_Y++
[4]       For Θ = Θmin; Θ <= Θmax; Θ++
[5]         For each edge point (v, φ) find (x, y) by Eq. 1-2
[6]           Update (-x, y, O_X, O_Y, Θ);
[7]           Update (x, -y, O_X, O_Y, Θ);
[8]           Update (-x, -y, O_X, O_Y, Θ);
[9]   End all
[10]  O_X, O_Y, Θ = max( h[ ][ ][ ])
[11]  Function Update (x, y, O_X, O_Y, Θ)
[12]      Find (v, φ) given (x, y) by Equations 1-2
[13]      If an edge point (tv, tφ) falls within a window of (v, φ)
[14]          Then h[O_X][O_Y][Θ]+= 1 /distance(((tv, tφ) (v, φ));
```

In the second symmetry voting, the $O_X$, $O_Y$ and $\theta$ are fixed and a similar algorithm is used to vote for $(\omega, \alpha)$ by using Functions $F_{1,2}$, $F_{1,2}^{-1}$ from above. Pseudo-code for the second symmetry voting is shown below.

```
[1]   Clear global g[ ][ ]
[2]   For ω = ωmin; ω <= ωmax; ω++
[3]     For α = α min; α <= α max; α ++
[5]       For each edge point (v, φ) find (x, y) by Equations 1-2
[6]         Update2 (-x, y, ω, α);
[7]         Update2 (x, -y, ω, α);
[8]         Update2 (-x, -y, ω, α);
[9]   End all
[10]  ω, α = max( g[ ][ ])
[11]  Function Update2 (x, y, ω, α)
[12]      Find (v, φ) given (x, y) by Equations 1-2
[13]      If an edge point (tv, tφ) falls within a window of (v, φ)
[14]          Then g[ω][α]+= 1 /distance(((tv, tφ) (v, φ));
```

After the optimal values for $O_X$, $O_Y$, $\theta$ and $(\omega, \alpha)$ are obtained, the edge map 614 is filtered using the symmetrical properties of the table. Given any point on the edge map 614 which is the projection of (x, y, 0), the point satisfies symmetry property if at least two of its symmetric projections are also on the edge map 614. It is noted that even though there are three symmetrically corresponding points, only two corresponding points are required in this particular implementation. Requiring all three projections on the edge map may be too strict due to some inaccuracies of the estimated parameters and image noise.

Figure 10:
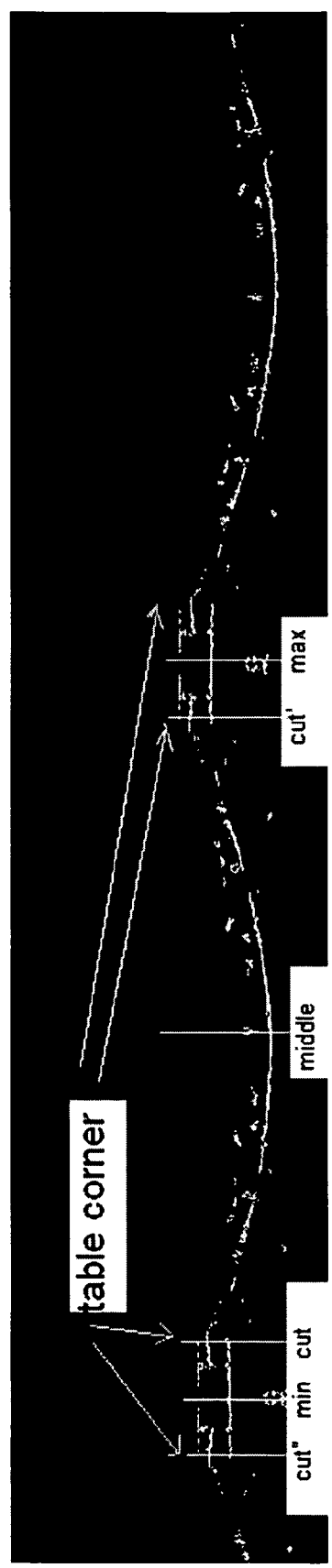
FIG. 10 depicts the edge map shown in FIG. 9 after the edge map has been symmetrically enhanced.

All points on the edge map 614 that do not satisfy the symmetry property are removed at block 808. For each point that satisfies the symmetry property, the other three projections of its symmetric points to the edge map 614 are added (block 808). The updated edge map is thereby symmetry enhanced. FIG. 10 depicts the edge map shown in FIG. 9 after the edge map has been symmetrically enhanced.

At block 810, the detected edge points are fit to the table model 622. The points on the symmetry-enhanced edge map are the inputs to the fitting module 620. Either of two fitting techniques may be implemented in the fitting module 620: trigonometric fitting or quadratic fitting.

If the table is an exact rectangle, then the trigonometric fitting is optimal. However, when designing the camera to be robust to different table models, the quadratic fitting works better as it is more generic and can be fit as a polynomial. The quadratic fitting also works with exactly rectangular tables.

It is noted that the above method can be modified to work with unilaterally symmetric (as opposed to bilaterally symmetric) tables. In such a case, there is only one symmetric point for each detected point, rather than the three symmetric points as described above for the bi-laterally symmetric example.

Trigonometric Fitting

The trigonometric fitting is a model-based approach. By assuming a rectangular table, the projected curve has the form of Equations 1-1 where W and L are the unknown parameters that need to be estimated. Since the edge map is symmetry-enhanced, use of edge points on only two of the four table edges is necessary. The two table edges are located between cut″ and cut (see FIG. 10), and the one between cut and cut′, where cut, cut′ and cut″ are all functions of W and L as shown below:

$$\theta_{cut} = \pi - \arctan((L-O_Y)/(W-O_X)) - hs$$

$$\theta_{cut'} = \pi + \arctan((L-O_Y)/(W-O_X)) - hs$$

$$\theta_{cut''} = \arctan((L-O_Y)/(W-O_X)) - hs$$

Suppose the edge points between cut″ and cut are $(\theta_i, z_i)$, i=1, ..., n; and between cut and cut′ are $(\theta_j, z_j)$, j=1, ..., m.

Then, if $\zeta=(L-O_Y)/(W+O_X)$ and $t=hr/(W+O_X)$, the cost function is defined as:

$$R = \sum_{i=1}^{n}(h + r\cos(\theta_i - \omega)\sin\alpha - t/\text{ratio} * \sin\theta_i - z_i)^2 + R = \quad \text{[Equation 1-3]}$$

$$\sum_{j=1}^{m}(h + r\cos(\theta_j - \omega)\sin\alpha + t\cos\theta_j - z_i)^2$$

which is a quadratic function of $\zeta$ and t.

The fitting algorithm works by trying all possible values of $\theta_{cut}$. For each $\theta_{cut}$, $\theta_{cut'}$ and $\theta_{cut''}$ are estimated according to the following formulas:

$\theta_{min}=\pi/2-hs$ $\theta_{max}=3\pi/2-hs$ $\theta_{middle}=\pi-hs$ $\theta_{cut'}=2*\theta_{middle}-\theta_{cut}$ $\theta_{cut''}=2*\theta_{min}-\theta_{cut}$ Then the following equation is computed:

$\zeta=\tan(\pi/2-\theta_{cut}+\theta_{min})$ and t is solved to minimize R. W and L are computer from $\zeta$ and t from Equation 1-3. Finally, among all the trials of $\theta_{cut}$, the one with the smallest value of R is chosen as the solution.

Quadratic Fitting

As previously mentioned, quadratic fitting is not limited to purely rectangular tables and can be applied with semi-rectangular tables. With quadratic fitting, two quadratic curves are fit to the edge points. L1 (sum of absolute error values) or L2 (least squares) can be used to find table parameters. L2 exhibits some problems with outlying points but is faster and easier to implement than L1. Conversely, L1 is more robust to outliers.

Any L1 or L2 estimator known in the art can be used to fit the curves, i.e. find the table parameters. Once the curves are fit, a model of the table is known and the table can be constructed in image space.

To regulate the fitted curve, each of the two quadratic curves is of the form $y=a+b(x-c)^2$. For edge points between cut" and cut, the curve $y=a_1+a_2(x-\theta_{min})^2$ is fit.

For edge points between cut and cut', the curve $y=b_1+b_2(x-\theta_{middle})^2$ is fit. The cost function:

$$R = \sum_{i=1}^{n}(v_i - a_1 - a_2(\theta_i - \theta_{min})^2)^2 + \sum_{j=1}^{m}(v_j - b_1 - b_2(\theta_j - \theta_{middle})^2)^2$$

is minimized with the linear constraint $S=a_1+a_2(\theta_{cut}-\theta_{min})^2-b_1-b_2(\theta_{cut}-\theta_{middle})^2=0$.

This quadratic optimization problem with linear constraints has closed form solution by using Lagrange multiplier.

Exemplary Methodological Implementation: Camera Usage

Figure 11:
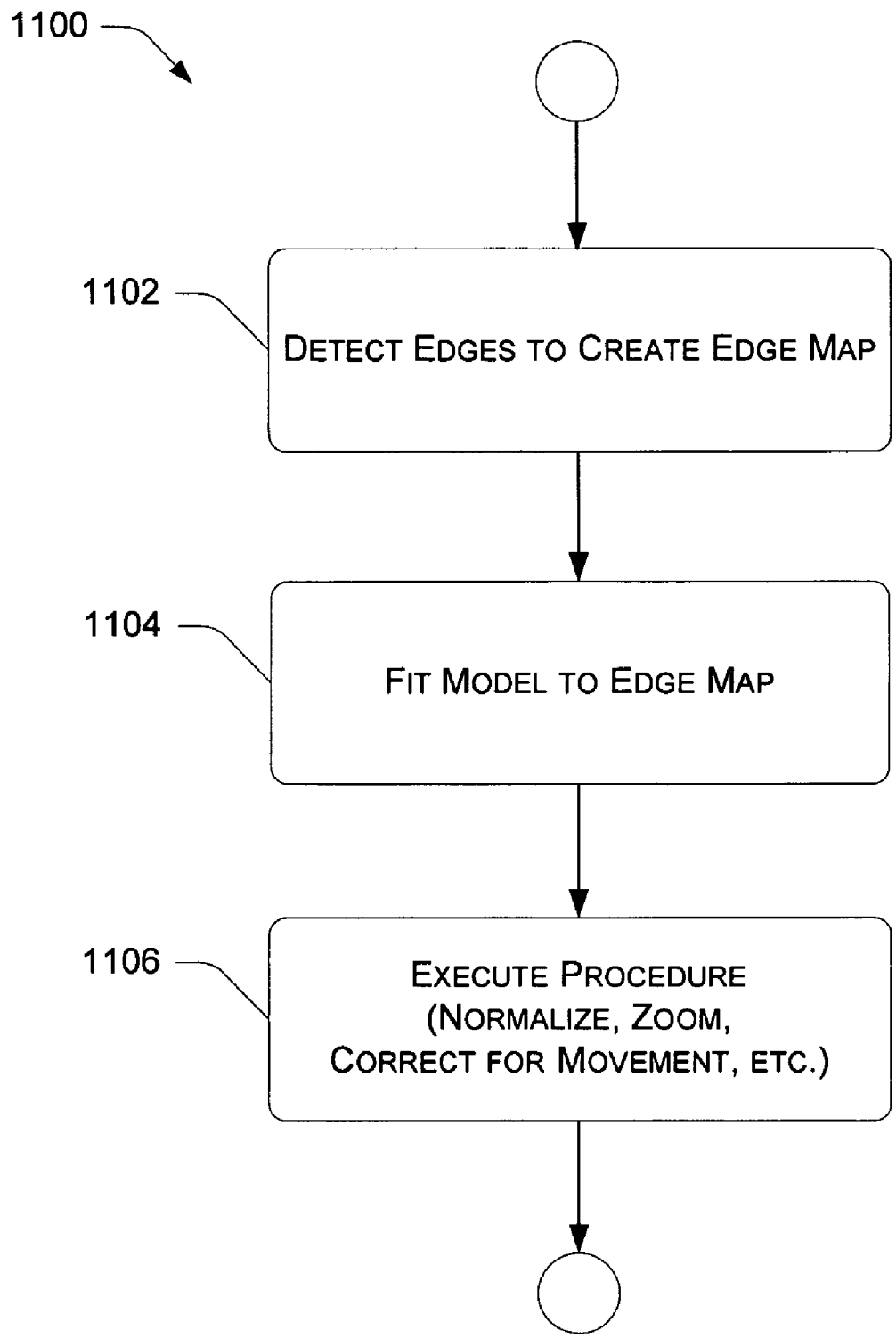
FIG. 11 is a flow diagram that depicts a methodological implementation for using a panoramic camera to automatically detect table edges and camera positional parameters and orientation while the camera is in operational mode.

FIG. 11 is a flow diagram 1100 that depicts a methodological implementation for using a panoramic camera to automatically detect table edges and camera positional parameters and orientation while the camera is in operational mode. Operational mode occurs after the camera has been trained on an uncluttered table. During operational mode, it is assumed that one or more persons is seated around the table and that one or more items are situated on the table (i.e., the table is cluttered).

At block 1102, the edge detector 612 detects edges in an image to create an edge map 614 as previously described. Although not shown in this particular implementation, it is noted that symmetry voting may be used as described above to clean up the edge map. However, since the table model is known, it is not a requirement to do so.

At block 1104, the table model 622 is fit to the edge map 614. It is noted that because of the symmetrical property of the table, only half of the table model needs to be fit to the edge map; the other half can be assumed.

To fit the table model 622 to the edge map 614, a chamfer distance between table model edges and the points on the edge map is derived. The chamfer distance is a sum of all distances between the feature points on the edge map and the table model. The chamfer distance is not normalized and can be in any unit that is convenient, such as pixels. The parameters that minimize the chamfer distance are then selected as the fitted model.

It is noted that, although one particular fitting method is described here, there are many other robust methods to fit models to edge maps that could be used without departing from the scope of the present description.

Exemplary Operating Environment

Figure 12:
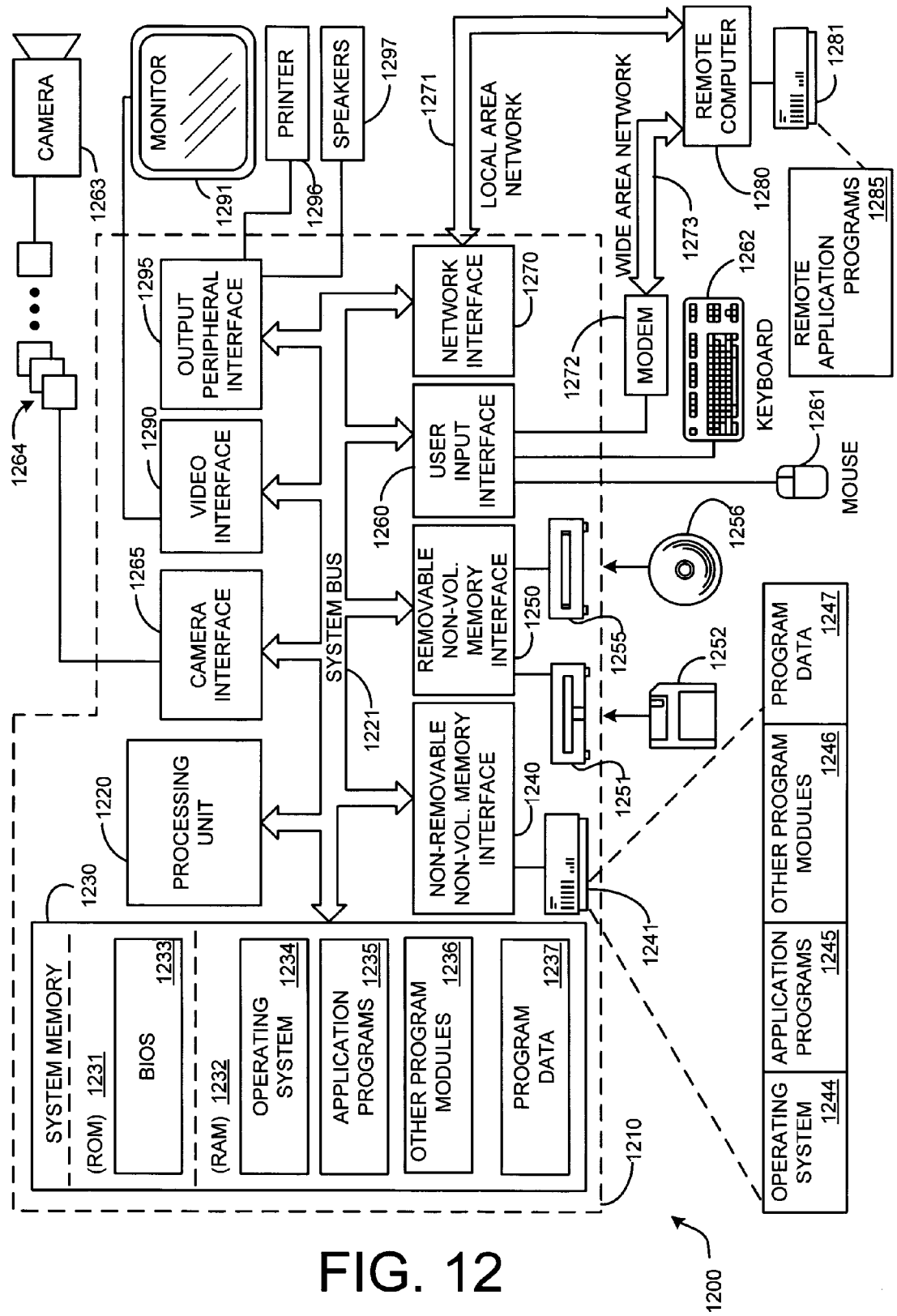
FIG. 12 is a block diagram depicting an exemplary general purpose computing device that may be used in conjunction with one or more implementations described herein.

FIG. 12 is a block diagram depicting a general purpose computing environment 1200 that may be used in one or more implementations according to the present description. The computing system environment 1200 is only one example of a suitable computing environment and is not intended to suggest any limitation as to the scope of use or functionality of the claimed subject matter. Neither should the computing environment 1200 be interpreted as having any dependency or requirement relating to any one or combination of components illustrated in the exemplary operating environment 1200.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media typically embodies computer readable instructions, data structures and/or program. Combinations of the any of the foregoing should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVD), digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the computer 1210 through input devices such as a keyboard 1262 and pointing device 1261, commonly referred to as a mouse, trackball or touch pad. Other input devices (not shown) may include a microphone, joystick, game pad, satellite dish, scanner, or the like. These and other input devices are often connected to the processing unit 1220 through a user input interface 1260 that is coupled to the system bus 1221, but may be connected by other interface and bus structures, such as a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295. A camera 1263 (such as a digital/electronic still or video camera, or film/photographic scanner) capable of capturing a sequence of images 1264 can also be included as an input device to the personal computer 1210. Further, while just one camera is depicted, multiple cameras could be included as an input device to the personal computer 1210. The images 1264 from the one or more cameras are input into the computer 1210 via an appropriate camera interface 1265. This interface 1265 is connected to the system bus 1221, thereby allowing the images to be routed to and stored in the RAM 1232, or one of the other data storage devices associated with the computer 1210. However, it is noted that image data can be input into the computer 1210 from any of the aforementioned computer-readable media as well, without requiring the use of the camera 1263.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computers may be used.

Conclusion

While one or more exemplary implementations have been illustrated and described, it will be appreciated that various changes can be made therein without departing from the spirit and scope of the claims appended hereto.

The invention claimed is:

1. One or more computer-readable storage media containing executable instructions that, when executed, implement a method comprising:
   detecting edges that appear in a camera image, the edges including table edges of a table upon which a camera taking the camera image is situated;
   determining which of the edges are table edges;
   determining camera position parameters that identify a location of the camera relative to the table edges;
   deriving a model of the table;
   deriving table parameters; and
   storing the table edges in memory.

2. The one or more computer-readable storage media as recited in claim 1, wherein:
   the table is at least laterally symmetric; and
   the determining which of the edges are table edges further comprises identifying an edge point on a first edge as a table edge point on a table edge if there is a symmetrically corresponding edge point on a second edge.

3. The one or more computer-readable storage media as recited in claim 2, wherein symmetry voting is used to determine which of the edges are table edges.

4. The one or more computer-readable storage media as recited in claim 1, wherein the camera position parameters further comprise an offset from a table center along a first medial axis of the table and an offset from the table center along a second medial axis of the table.

5. The one or more computer-readable storage media as recited in claim 4, wherein the camera position parameters further comprise a direction and magnitude of a camera tilt.

6. The one or more computer-readable storage media as recited in claim 1, further comprising storing the table model in computer-readable memory.

7. The one or more computer-readable storage media as recited in claim 1, wherein the detecting edges is performed when the table is uncluttered and the one or more computer-readable media further comprise instructions that, when executed, perform the additional steps of:
   detecting edges that appear in a camera image included the table when the table is cluttered;
   fitting the table model to the detected edges; and
   using the table parameter information to normalize head sizes in the camera image.

8. A camera device, comprising:
   means for capturing a panoramic image;
   an edge detector configured to identify edges included in the panoramic image to create an edge map that includes edges corresponding to table edges of a table on which the panoramic camera is situated;
   a voting module configured to filter the edge map to derive a symmetry-enhanced edge map and to derive camera position parameters; and
   a fitting module configured to fit the symmetry-enhanced edge map to a table model to derive table dimensions.

9. The camera device as recited in claim 8, wherein the voting module is further configured to discard an edge point if there is no symmetrically corresponding edge point in the edge map.

10. The camera device as recited in claim 8, wherein the fitting module is further configured to utilize a trigonometric fitting function to fit the symmetry-enhanced edge map to the table model.

11. The camera device as recited in claim 8, wherein the fitting module is further configured to utilize a quadratic fitting function to fit the symmetry-enhanced edge map to the table model.

12. The camera device as recited in claim 8, wherein the camera position parameters further comprise a first camera offset from a table center along a first table axis and a second camera offset from the table center along a second table axis.

13. The camera device as recited in claim 8, further comprising an actuatable training initiation button that, when actuated, initiates a process to derive the table dimensions.

14. The camera device as recited in claim 8, wherein:
   the edge map further comprises a first edge map that is created when the table is uncluttered;
   the edge detector is further configured to create a second edge map when the table is cluttered; and
   the fitting module is further configured to fit the table model to the second edge map.

15. The camera device as recited in claim 14, further comprising a head size normalization module configured to normalize head sizes of people seated around at least a portion of the perimeter of the table in the panoramic image.

16. A method, comprising:
   creating a first edge map from a camera image that includes a table having table edges, the first edge map being created when no objects are situated on top of the table in the camera image;
   identifying the table edges from the first edge map;
   determining a camera position;
   fitting the first edge map to a table model to identify table parameters;
   creating a second edge map when one or more objects are situated on top of the table in the camera image;
   fitting the table model to the second edge map; and
   performing a procedure on the camera image that utilizes the table parameters,
   wherein steps of the method are performed by a computer.

17. The method as recited in claim 16, wherein the performing a procedure on the camera image further comprises performing a head size normalization on the camera image to normalize head sizes of people appearing in the camera image.

18. The method as recited in claim 16, wherein the determining a camera position further comprising determining at least a first camera offset and a second camera offset, the first camera offset being a distance that the camera is located from a table center along a first table axis, the second camera offset being a distance that the camera is located from the table center along a second table axis.

19. The method as recited in claim 16, wherein the determining a camera position further comprising determining a direction and magnitude of a camera tilt.

20. The method as recited in claim 16, wherein the fitting the first edge map step further comprises utilizing a quadratic function to fit the first edge map to a table model.

* * * * *